United States Patent [19]

Krejci et al.

[11] 4,117,197

[45] Sep. 26, 1978

[54] PRODUCTION OF COATED BUILDING COMPONENTS

[75] Inventors: Milan Krejci; Peter Kresse, both of Krefeld-Bockum, Fed. Rep. of Germany

[73] Assignee: Bayer Aktiengesellschaft, Leverkusen, Fed. Rep. of Germany

[21] Appl. No.: 721,128

[22] Filed: Sep. 7, 1976

[30] Foreign Application Priority Data

Sep. 6, 1975 [DE] Fed. Rep. of Germany ........ 2539718

[51] Int. Cl.$^2$ ............................................. B32B 19/04
[52] U.S. Cl. ......................................... 428/443; 52/517; 427/299; 427/369; 427/370; 427/379; 427/380; 427/403; 427/419 R; 428/446; 428/539
[58] Field of Search ............... 427/369, 370, 379, 380, 427/403, 419 R, 419 A, 299, 301; 428/446, 443, 454, 539; 52/517

[56] References Cited

U.S. PATENT DOCUMENTS

| | | | |
|---|---|---|---|
| 2,294,247 | 8/1942 | Smith | 427/403 |
| 2,347,684 | 5/1944 | Hatch et al. | 427/380 |
| 2,350,030 | 5/1944 | Greider et al. | 427/380 |
| 2,354,350 | 7/1944 | Schuetz | 427/379 |
| 2,354,351 | 7/1944 | Schuetz | 427/379 |
| 2,372,285 | 3/1945 | Marc et al. | 428/446 |
| 2,683,096 | 7/1954 | Eckert et al. | 428/446 |
| 2,687,359 | 8/1954 | Cleary | 428/446 |
| 2,720,469 | 10/1955 | Serkin | 427/403 |
| 2,946,158 | 7/1960 | Seipt | 428/446 |
| 3,169,075 | 2/1965 | Morrow et al. | 428/454 |
| 3,197,529 | 7/1965 | Greiner | 428/446 |
| 3,488,209 | 1/1970 | Ayers | 427/299 |
| 3,759,774 | 9/1973 | Bader et al. | 427/370 |

FOREIGN PATENT DOCUMENTS 473,158  10/1937  United Kingdom .................... 427/403

Primary Examiner—Ronald H. Smith
Assistant Examiner—Sadie L. Childs
Attorney, Agent, or Firm—Burgess, Dinklage & Sprung

[57] ABSTRACT

In the production of a coated building component comprising the steps of mixing an inorganic binder, water and aggregate to produce a workable mass, molding said mass into a preformed component, applying to the preformed component an aqueous paste containing a metal oxide and at least one of waterglass and a phosphate to form a coating and allowing the coating to harden, the improvement which comprises applying about 190 to 400 g of the paste per square meter of surface to be coated, the application being effected in the presence of at least about 0.5% by weight of the inorganic binder or, in the case of lime-sand bricks, by weight of the binder plus aggregate, of a water soluble inorganic salt which converts the aqueous paste into a gel-like non-flowing form. The inorganic salt can be included in the workable mass from which the preformed component is molded or it may be present in a preliminary layer, along with inorganic binder, which is applied to the preformed component in a thickness of about 1 to 50 mm prior to application of the aqueous paste.

31 Claims, No Drawings

PRODUCTION OF COATED BUILDING COMPONENTS

It is known that slabs of asbestos cement can be provided with a glaze-like coating, preferably based on silicate or phosphate. In addition to $SiO_2$, other constituents, for example oxides, carbonates and phosphates, are also present in the case of silicate-containing coatings, Mg, Pb, Ca, B, Zn and Al preferably being present as cations. Coated asbestos cement panels of this kind are relatively expensive products which are produced by a labor-intensive process. In general, an aqueous pigment paste, consisting essentially of waterglass and, for example, zinc oxide as oxidic component, is sprayed onto the already hardened asbestos cement slabs, the quantitative ratio between the two components being such that glaze-like silicates can form. Hardening of the coating to form silicates is carried out either in an autoclave under pressure at elevated temperature or by a purely thermal treatment at normal pressure. Thus, the slab is produced and coated in two separate operations. In the case of cheap mass-produced products, for example concrete roof tiles or lime-sand bricks, a procedure such as this for coating is not economical. However, the glaze-like coatings provide the coated articles with an attractive appearance and extreme durability and, therefore, a process which enabled coating to be carried out at reasonable expense would be of interest.

Hitherto concrete roof tiles have been produced by extruding a generally pigmented concrete mixture by machine into molds (so-called pallets). The extruded concrete roof tile may then be coated over its surface with a thin, similarly pigmented cement slurry into which colored sand granulate has been scattered (R. G. Paasch: Eigenschaften und Herstellung Farbiger Betondachsteine unter Verwendung anorganischer Pigmente (Properties and Production of Colored Concrete Roof Tiles using Inorganic Pigments), Betonstein-Zeitung, No. 10 1959; H. E. Schulz: Der Betondachstein und seine Herstellung in Deutschland (The Concrete Roof Tile and its Manufacture in Germany), Betonstein-Zeitung, No. 5 1964). However, it is also common practice to use the simple extruded concrete roof tile. The pallets are automatically stacked and placed in a so-called humidity chamber for hardening the concrete. After hardening, the tiles are separated from their molds (which return immediately to the production process) while the tiles themselves are either sprayed with a dispersion dye, for example, based on acrylate, or are directly stockpiled.

Returning the hardened concrete roof tiles to the production process for coating with silicate, followed by hardening, is uneconomical.

Lime-sand bricks are generally made from a moist mixture of hydrate of lime and sand which is molded and hardened (Der Kalksandstein (The Lime-Sand Brick), Schriftenreihe des Bundesverbandes fur Kalksandsteinindustrie e.V., 1963, pages 12 et seq, Verlag Hanseatische Druckanstalt GmbH, Hamburg). In the manufacture of concrete roof tiles, autoclave hardening has hitherto not generally been applied in practice, although it is already in use in addition to thermal hardening in the absence of pressure in the case of asbestos cement (Asbestzement, H. Klos, 1967 page 103, Verlag Springer), In constrast, lime-sand bricks are only ever hardened in an autoclave. Thus, by applying a glaze-like coating, it is also possible in the case of lime-sand bricks, just as in the case of asbestos cement slabs and concrete roof tiles, to obtain a product with a particularly durable surface in a number of colors which should broaden the scope of application of lime-sand bricks as facing bricks.

Accordingly, the object of the present invention is to develop a simple process for applying glaze-like coatings to preformed, non-hardened components based on inorganic binders such as lime or cement.

The present invention provides a process for coating a preformed component based on an inorganic binder containing standard aggregates with a glaze-like silicate-containing and/or phosphate-containing coating, wherein a component is molded from a workable mass comprising an inorganic binder, water and standard aggregates and wherein an aqueous paste containing waterglass and/or a phosphate and a metal oxide is applied to the preformed component in a quantity of from 190 to 400 $g/m^2$ of surface to be coated in the presence of at least one soluble inorganic salt, the salt being present in a quantity of at least about 0.5% by weight based on the inorganic binder or, in the case of lime-sand bricks, based on the binder plus aggregate, whereby the inorganic salt converts the aqueous paste into a gel-like non-flowing form, and wherein the preformed component and coating are subsequently hardened.

According to one embodiment, the inorganic salt is present by virtue of having been mixed into the workable mass from which the preformed component is molded.

The preformed components to be coated in accordance with this embodiment may be, for example, concrete roof tiles, asbestos cement slabs or lime-sand bricks. The coating process is preferably applied to concrete roof tiles and lime-sand bricks. In the case of cement-containing masses used for making concrete roof tiles, the mass employed as starting material for producing the components has a water-binder factor (ratio by weight of water to cement) of about 0.3 to 0.5. In the case of asbestos cement components, the water content amounts to between about 30 and 50% by weight, based on the total weight of the mass. In the case of lime mortars (hydrate of lime as binder), the water content should amount to at least about 5% by weight and preferably to about 6 and 8% by weight (based on the binder plus aggregate). The mass from which components can be molded may additionally contain the usual aggregates, for example diluents such as sand, pigments such as iron oxides, sealing compounds such as calcium stearate, plasticizers such as lignin sulfonate, in the usual quantities (Albrecht, Mannhertz, "Zusatzmittel, Anstrichstoffe, Hilfsstoffe fur Beton und Mortel" (Additives, Coating Compositions, Auxiliaries for Concrete and Mortar), 1968, pages 38 et seq, Bauverlag GmbH, Wiesbaden). In the case of asbestos cement components, the amount of asbestos fibers in the mass may be in the usual range, i.e. from about 10 to 20% by weight, based on the total dry weight.

According to this embodiment, inorganic compounds, which convert a paste applied to the preformed components into a gel-like non-flowing form, are added to the masses containing cement or hydrate of lime in quantities of from about 1 to 5% by weight, based on cement (where cement is used as the inorganic binder), or in quantities of about 0.5 to 2.0% by weight, based on total dry weight (in cases where masses containing hydrate of lime are used). In the case of masses used as starting material for concrete roof tiles or precast concrete members, the preferred addition amounts to between about 1 and 2% by weight, based on cement; in the case of masses used for the production of asbestos cement slabs, the preferred addition amounts to between about 1 and 5% by weight, based on cement, and in the case of masses used for the production of lime-sand bricks, the preferred addition amounts to between about 1 and 2% by weight, based on the weight of the dry components. It is possible in accordance with the invention to add alkaline earth metal salts, for example, calcium formate, calcium chloride, calcium nitrate, magnesium nitrate and magnesium chloride, or alkali metal salts for example, potassium chloride, sodium formate, sodium acetate, or iron salts for example, iron-(III)chloride or aluminum salts for example, aluminum chloride. The alkali metal salts are generally added in larger quantities, preferably in quantities which correspond to the upper limits mentioned above. The compounds preferably added are calcium formate and/or calcium chloride. These compounds may be added either as such or in aqueous solution.

According to another embodiment, the inorganic salt is present in a preliminary layer which is applied to the preformed components in a layer thickness of about 1 to 50 mm, preferably about 1 to 20 mm, prior to application of the aqueous paste. Thus, in this embodiment also the inorganic salt is present in the stratum just below the aqueous paste. The preliminary layer contains an inorganic binder, and optionally aggregates and/or water as described hereinabove.

The preformed components to be coated in accordance with this embodiment may be, for example, concrete roof tiles, precast concrete members, asbestos cement slabs or lime-sand bricks. The coating process is preferably applied to precast concrete members and lime-sand bricks. In the case of cement-containing masses used for making concrete roof tiles or precast concrete members, the mass employed as starting material for producing the components has a water-binder factor (ratio by weight of water to cement) of about 0.3 to 0.7. In the case of asbestos cement components, the water content amounts to between about 30 and 94% by weight, based on the total weight of the mass. In the case of lime mortars (hydrate of lime as binder), the water content should amount to at least about 5% by weight (based on binder plus aggregate). The mass from which components can be molded may additionally contain the conventional ingredients as described in connection with the preceding embodiment.

According to this embodiment, a preliminary layer, which reaches a layer thickness of about 1 to 50 mm, preferably about 1 to 20 mm, depending upon the type of consolidation, is applied as uniformly as possible to the preformed components. Depending upon the type of building material, the preliminary layer is consolidated in the absence of pressure (for example precast concrete members by vibration) or under pressure of up to about 600 kp/cm² (for example asbestos cement slabs). The preliminary layer contains organic binders, optionally standard additives and/or water and soluble inorganic salts which convert an aqueous phase based on waterglass and/or phosphate and metal oxide applied to the preliminary layer on the preformed components into a gel-like non-flowing form.

The preferred inorganic salts and their proportions are substantially the same in this embodiment as in the preceding embodiment.

In addition, the preliminary layer may contain the usual aggregates, as already described in reference to the composition of the preformed components. The mass from which the components are molded and the preliminary layer do not have to contain the same inorganic binder, although this is preferably the case. In the case of preliminary layers based on cement, for example in the case of precast concrete members and concrete roof tiles, the water to cement ratio (WC) may amount to between about 0 and 0.5 and preferably to between about 0 and 0.4. In the case of asbestos cement, the moisture content before pressing may amount to between and 50% and preferably to between about 0 and 40% while, in the case of preliminary layers based on hydrate of lime, for example lime-sand bricks, it may amount to between about 5 and 8% and preferably to between about 6 and 8%.

The composition of the paste with which the preformed components (either alone or provided with a preliminary layer) are coated in accordance with the invention may vary within relatively wide limits. Preferred coating pastes contain alkali metal silicate, for example sodium silicate in aqueous solution (waterglass), metal oxides, for example ZnO, MgO, PbO, CaO, $B_2O_3$, $Al_2O_3$, either individually or in any combination, the $SiO_2$-content amounting to between about 42 and 63 mole %, the $Na_2O$-content to between about 11 and 27 mole % and the total metal oxide content to between about 19 and 42 mole % (based on the total weight of these components). It is also possible to use oxide-containing compounds for example, carbonates or phosphates for the necessary metal oxide content in the paste. The paste may also contain pigments, for example $TiO_2$, red, yellow or black iron oxides and/or iron oxide hydroxides, chromium oxide pigments, conventional fillers for example, kaolin and calcium carbonate. Pigments, fillers and water are added in such quantities that a readily processible, sprayable and spreadable paste is obtained. In addition, the pigment and/or filler content in the paste should not exceed about 25% by weight and preferably amounts to between about 10 and 15% by weight. Pastes of this kind based on waterglass are known for example from J. G. Vail "Soluble Silicates", Vol. II, pages 322 et seq (1952), Reinhold Publishing, New York; U.S. Pat. No. 2,354,350; German Offenlegungsschrift No. 1,571,579.

The various components of a waterglass paste are processed, for example in a dissolver or in ballmills, to form a homogeneous paste and in this form are sprayed, injected or spread in a thin layer (approximately 40 to 80 microns) onto the preformed components. Approximately 190 to 400 g and preferably about 250 to 300 g of waterglass paste are used per square meter of the surface of the preformed component to be coated.

After the waterglass paste has been applied to the preformed component, the waterglass paste is initially left to solidify into a gel-like non-flowing form. In the case of concrete roof tiles, asbestos cement slabs and lime-sand bricks coated in accordance with the invention, this solidification takes about 0.5 to 3 hours, the necessary solidification time being at the lower end of the above-mentioned time range in cases where inorganic salts are added in relatively large quantities to the mass from which the components are preformed. After solidification, the preformed component and solidified coating can be hardened.

Hardening is preferably carried out in an indirectly electrically heated autoclave at temperatures in the range of about 150° to 210° C., preferably at temperatures in the range of about 170° to 180° C., under pressures of about 4 to 19 bars and preferably under pressures of about 7 to 10 bars.

In the case of concrete roof tiles, the hardening time at the above-mentioned temperature amounts to between about 4 and 8 hours, in the case of asbestos cement slabs to between about 8 and 12 hours and in the case of lime-sand bricks to between about 4 and 8 hours.

Basically, however, it is not absolutely essential to carry out hardening in an autoclave in order to obtain a hard weatherproof glaze-like coating according to the invention on the components. Thus, it is possible in the hardening of concrete roof tiles or asbestos cement slabs coated in accordance with the invention to apply the waterglass paste coating to the fresh non-set concrete roof tile or asbestos cement slab, to harden it in the usual way at ambient temperature in air (maximum relative air humidity during solidification of the silicate coating preferably below about 60%) for about 14 to 28 days and then to complete hardening by a heat treatment at temperatures in the range of about 200° C. to 400° C.

By virtue of the process according to the invention, it is readily possible to provide concrete components (for example concrete roof tiles, precast concrete members), asbestos cement slabs and lime-sand bricks, with a glaze-like coating characterized by extreme hardness and weather resistance. Solidification of the waterglass coloring on the component takes place more quickly, the larger the addition of compounds with the coagulating effect according to the invention. After the solidification, hardening of the building material itself and its coating may be carried out either in a single operation in the autoclave, or alternatively the coated component may first be left to set in the usual way by standing in air, followed by hardening of the waterglass paste coating under heat.

The process according to the invention is illustrated by the following Examples:

EXAMPLE 1a

Production of Coated Concrete Roof Tiles

Portland cement and Rhine sand (particle size up to 3 mm) were intensively mixed with the following additives in a mixing ratio (ratio by weight) of 1:3 in the presence of water (water-binder value [cement] 0.37):
a. 1% by weight of calcium chloride, based on the cement
b. 2% by weight of calcium formate, based on the cement.

The mixture was then processed in a type 270065 test concrete roof tile machine (built in 1970 by Ing, Kurt Schade) to form concrete roof tiles measuring 20 × 30 cm.

A waterglass paste with the following composition was then applied to the concrete roof tiles thus produced:
Sodium waterglass 37° to 40° Be: 70 parts by weight
ZnO: 15 parts by weight
Kaolin: 5 parts by weight
Pigment (iron oxide): 5 parts by weight
Water: 5 parts by weight The waterglass paste was sprayed on in a thin layer in a quantity of 300 g per square meter of concrete roof tile surface.

After standing in air for approximately 90 minutes, the paste on the surface of the concrete roof tiles was no longer free-flowing and had solidified to such an extent that the concrete roof tile and the coating could be hardened. Hardening was carried out in an indirectly heated autoclave at temperatures of from 170° C. to 180° C. under a pressure of from 8 to 9 bars. After a hardening time of 4 hours, hardening was complete. The hardened concrete roof tiles had a uniform impervious coating.

EXAMPLE 1b

Production of Coated Concrete Roof Tiles

Portland cement and Rhine sand (particle size up to 3 mm) were intensively mixed with the following additive in a mixing ratio (ratio by weight) of 1:3 in the presence of water (water-binder factor [cement] 0.37):
2% by weight of calcium chloride, based on the cement.

The mixture was then processed in a type 270065 test concrete roof tile machine (built in 1970 by Ing. Kurt Schade) to form concrete roof tiles measuring 20 × 30 cm.

The same waterglass paste as in Example 1a was applied in the same layer thickness to the concrete roof tiles thus produced.

After standing in air for approximately 30 minutes, the paste on the surface of the concrete roof tiles was no longer free-flowing and had solidified to such an extent that the concrete roof tile and the coating could be hardened. Hardening was carried out in an indirectly heated autoclave at temperature of from 170° C. to 180° C. under a pressure of from 8 to 9 bars. After a hardening time of 4 hours, hardening was complete. The hardened concrete roof tiles had a uniform impervious coating.

EXAMPLE 2

Production of coated lime-sand bricks

A mixture of 10 parts by weight of hydrate of lime, 90 parts by weight of "Eifel" chippings, 1.0% by weight of calcium formate and a total water content of 7% by weight, based on the mass, was molded into lime-sand bricks under a pressure of 300 kp/cm².

A waterglass paste with the same composition as in Example 1a was applied in a quantity of 250 g/m². The bricks were then treated in an autoclave for 8 hours at 170° C. to 180° C./8 bars. Thereafter, the resulting lime-sand bricks had a uniform impervious coating.

EXAMPLE 3

Production of Coated Precast Concrete Members

Portland cement and aggregates of the composition

| Sand | |
|---|---|
| 0 – 4 mm | 31.6% |
| 4 – 8 mm | 31.0% |
| 8 – 16 mm | 34.0% |
| Quartz Powder | |
| W 3 | 3.4% |
| | 100.0% | were intensively mixed in a mixing ratio (MR) of 1:6 in the presence of water (water content to binder ratio, i.e.

wc, 0.5). The mixture was introduced into a 40/40 cm steel mold and uniformly distributed therein. A preliminary layer of the following composition was applied to the mixture:
Portland cement 350° F.
Rhine sand 0–4 mm
MR 1:6
WC ratio 0.3
Addition of 2% of Ca(HCOO)$_2$, based on the weight of the cement.

The layer thickness amounted to approximately 2 cm, the component was consolidated by vibration.

A waterglass paste of the following composition was applied to the precast concrete members provided with the preliminary layer:
Soda waterglass 37° to 40° Be: 70 parts by weight
ZnO: 15 parts by weight
Kaolin: 5 parts by weight
Pigment (iron oxide): 5 parts by weight
Water: 5 parts by weight The waterglass paste was sprayed on in a thin layer in a quantity of 300 g per square meter of surface area of the precast concrete members.

After standing in air for approximately 90 minutes, the paste on the surface of the precast concrete members was no longer free-flowing and had solidified to such an extent that the precast concrete member, the preliminary layer and the coating could be hardened. Hardening was carried out in an indirectly heated autoclave at temperatures of from 170° to 180° C. under a pressure of 8 to 9 bars. After a hardening time of 4 hours, hardening was complete. The hardened concrete roof tiles had a uniform impervious coating.

EXAMPLE 4

Production of Coated Lime-sand Bricks

A basic mixture of the following composition:
"Eifel" chippings 0–1 mm: 90% by weight
Hydrate of lime: 10% by weight
Total moisture 5%
was intensively mixed and introduced into a steel mold in which it was uniformly distributed.

An equally thoroughly mixed preliminary layer of the following composition
"Eifel" chippings 0–1 mm: 90% by weight
Hydrate of lime: 10% by weight
Total moisture 8%
Addition of 1.5% of CaCl$_2$ (based on total dry weight) was applied to this basic mixture in the mold so that, after pressing, a layer thickness of approximately 1 cm was attained.

Pressing was carried out in a press of the type manufactured by Henke Maschinenfabrik GmbH, Bad Oeynhausen: dimensions of the bricks 4.5 × 11.5 × 7.0 cm; pressure applied 300 kp/cm$^2$.

A waterglass paste with the same composition as the waterglass paste used in Example 1 was then applied to the lime-sand bricks provided with the preliminary layer.

After standing in air for approximately 90 minutes, the paste on the surface of the lime-sand bricks was no longer free flowing and had solidified to such an extent that the lime-sand bricks, the preliminary layer and the coating could be hardened. Hardening was carried out in an indirectly heated autoclave at a temperature of from 170° C. to 180° C. under a pressure of from 8 to 9 bars. After a period of 8 hours, hardening was complete.

The hardened lime-sand bricks had a uniform impervious coating.

It will be appreciated that the instant specification and examples are set forth by way of illustration and not limitation, and that various modifications and changes may be made without departing from the spirit and scope of the present invention.

What is claimed is:

1. In the production of a coated building component such as a concrete roof tile, precast concrete member, asbestos cement member or lime-sand brick, comprising the steps of mixing an inorganic binder, water and aggregate to produce a workable mass, molding said mass into a preformed component, applying to the preformed component an aqueous paste containing a metal oxide and at least one of waterglass and a phosphate to form a coating and allowing the coating to harden, the improvement which comprises applying about 190 to 400 g of the paste per square meter of surface to be coated prior to hardening of such surface, the application being effected in the presence of at least about 0.5% by weight of the inorganic binder or, in the case of lime-sand bricks, by weight of the binder plus aggregate, of a water soluble inorganic salt which converts the aqueous paste into a gel-like non-flowing form, the inorganic salt being included in the foundation or protective layer.

2. A process as claimed in claim 1, wherein the inorganic binder comprises hydrate of lime and the workable mass has a water content of at least 5% based on the weight of binder plus aggregate.

3. A process as claimed in claim 1, wherein the water content is about 6 to 8% by weight based on the binder plus aggregate.

4. A process as claimed in claim 1, wherein the inorganic salt is at least one salt of an alkali metal, alkaline earth metal, aluminum or iron and is present in a quantity of about 0.5 to 5% by weight of the inorganic binder, or of the total dry weight in the case of masses containing hydrate of lime, in the stratum immediately therebelow.

5. A process as claimed in claim 1, wherein the inorganic salt comprises at least one member selected from the group consisting of calcium formate, calcium chloride, calcium nitrate, magnesium nitrate, magnesium chloride, potassium chloride, sodium formate, sodium acetate, iron(III)chloride and aluminum oxide.

6. A process as claimed in claim 1, wherein the aqueous paste also contains at least one pigment or filler.

7. A process as claimed in claim 1, wherein the aqueous paste contains an alkali metal silicate and has an SiO$_2$ content of about 42 to 63 mole %, an alkali metal oxide content of about 11 to 27 mole % and a metal oxide content of about 19 to 42 mole %.

8. A process as claimed in 7, wherein about 250 to 300 g of paste are applied per square meter of surface to be coated.

9. A process as claimed in claim 1, wherein after it has been applied to the preformed component, the paste is solidified at ambient temperature over a period ranging from about 0.5 to 3 hours.

10. A process as claimed in claim 1, wherein the preformed component coated with paste is hardened at a temperature of about 150° to 210° C. and under a pressure of about 4 to 19 bars.

11. A process as claimed in claim 10, wherein the temperature is from about 170° to 180° C. and the pressure is about 7 to 10 bars.

12. A process as claimed in claim 10, wherein the building component is a concrete roof tile or precast concrete member and the hardening time is from about 4 to 8 hours.

13. A process as claimed in claim 10, wherein the building component is an asbestos cement slab and the hardening time is from about 8 to 12 hours.

14. A process as claimed in claim 10, wherein the building component is a lime-sand brick and the hardening time is from about 4 to 8 hours.

15. A process as claimed in claim 1, wherein the preformed coated component is first hardened by standing in air for about 14 to 28 days, after which the paste coating is hardened at a temperature of about 150° to 210° C. and under a pressure of about 4 to 19 bars.

16. A process as claimed in claim 1, wherein the preformed coated component is first hardened by standing in air for about 14 to 28 days, after which the paste coating is hardened at a temperature of about 170° to 180° C. and under a pressure of about 7 to 10 bars.

17. A process as claimed in claim 1, wherein the performed coated component is first hardened by standing in air for about 14 to 28 days, after which the paste coating is hardened at ambient pressure and at a temperature of about 200° to 400° C.

18. A process as claimed in claim 1, wherein the inorganic salt is present in the preformed component, having been mixed into the workable mass prior to molding.

19. A process as claimed in claim 18, wherein the inorganic binder comprises cement and the workable mass has a water to cement ratio by weight of about 0.3 to 0.5.

20. A process as claimed in claim 18, wherein the inorganic binder comprises asbestos cement and the workable mass has a water content of about 30 to 50% based on the total weight.

21. A process as claimed in claim 1, wherein prior to the application of the aqueous paste there is applied to the preformed component a preliminary layer of a thickness of about 1 to 50 mm, the preliminary layer containing at least one inorganic binder and the water soluble inorganic salt.

22. A process as claimed in claim 20, wherein the thickness of the preliminary layer is from about 1 to 20 mm.

23. A process as claimed in claim 20, wherein the preliminary layer also contains at least one of an aggregate and water.

24. A process as claimed in claim 20, wherein the inorganic binder of the preliminary layer comprises cement and the weight ratio of water to cement in the workable cement-containing mass is between about 0.3 to 0.7.

25. A process as claimed in claim 21, wherein the inorganic binder of the preliminary layer comprises asbestos cement and the water content is adjusted to a value of about 30 to 94% based on the total weight.

26. A process as claimed in claim 21, wherein the preliminary layer comprises cement and aggregate and is applied to a precast concrete component or a concrete roof tile, the water to cement weight ratio in the preliminary layer ranging between about 0 to 0.5:1.

27. A process as claimed in claim 26, wherein the water to cement ratio ranges between about 0 and 0.4:1.

28. A process as claimed in claim 21, wherein the preliminary layer comprises cement and asbestos and has a moisture content of about 0 to 50% by weight, is applied to an asbestos cement preformed component, and is thereafter pressed prior to hardening.

29. A process as claimed in claim 28, wherein the moisture content is between about 0 to 40%.

30. A process as claimed in claim 21, wherein the preliminary layer comprises hydrate of lime and sand, is applied to lime-sand bricks, and has a moisture content between about 5 and 8%.

31. A coated building component produced by the process of claim 1.

* * * * *

UNITED STATES PATENT AND TRADEMARK OFFICE
CERTIFICATE OF CORRECTION

PATENT NO. : 4,117,197
DATED : September 26, 1978
INVENTOR(S) : Milan Krejci et al It is certified that error appears in the above–identified patent and that said Letters Patent are hereby corrected as shown below:

First page of Patent, Item [30], Foreign Application Priority Data, add --January 22, 1976, Federal Republic of Germany, 2602365 .

Signed and Sealed this

Sixth Day of March 1979

[SEAL]

Attest:

RUTH C. MASON
*Attesting Officer*

DONALD W. BANNER
*Commissioner of Patents and Trademarks*